United States Patent [19]

Omata

[11] Patent Number: 5,542,061
[45] Date of Patent: Jul. 30, 1996

[54] ARRANGEMENT OF CONTROLLING ISSUE TIMING OF A READ INSTRUCTION TO A COMMON BLOCK IN A VECTOR PROCESSOR

[75] Inventor: Makoto Omata, Yamanashi, Japan

[73] Assignee: NEC Corporaiton, Tokyo, Japan

[21] Appl. No.: 438,077

[22] Filed: May 8, 1995

Related U.S. Application Data

[63] Continuation of Ser. No. 4,900, Jan. 21, 1993, abandoned.

[51] Int. Cl.$^6$ ............................................. G06F 9/34
[52] U.S. Cl. ........................ 395/375; 395/550; 395/800; 364/DIG. 1
[58] Field of Search ......................... 395/375, 550, 395/800

[56] References Cited

U.S. PATENT DOCUMENTS

| | | | |
|---|---|---|---|
| 4,594,682 | 6/1986 | Drimak | 395/800 |
| 4,739,472 | 4/1988 | Hayashi | 395/375 |
| 4,789,925 | 12/1988 | Lahti | 395/800 |
| 5,001,626 | 3/1991 | Kashiyama et al. | 395/800 |
| 5,014,196 | 5/1991 | Hayashi et al. | 395/800 |
| 5,125,083 | 6/1992 | Fite et al. | 395/375 |
| 5,297,139 | 3/1994 | Okura et al. | 370/60 |

FOREIGN PATENT DOCUMENTS

| | | |
|---|---|---|
| 59-163671 | 1/1985 | Japan . |
| 63-127368 | 10/1988 | Japan . |
| 63-186372 | 12/1988 | Japan . |

*Primary Examiner*—Parshotam S. Lall
*Assistant Examiner*—Viet Vu
*Attorney, Agent, or Firm*—Foley & Lardner

[57] ABSTRACT

In order to effectively accelerate issue of a RAM read instruction which is to access the same memory block as a preceding RAM write instruction, when the RAM write instruction is issued, a counter initiates counting-up of a value indicative a predetermined time duration. When the counter counts up the value, the RAM read instruction is allowed to be issued at appropriate timing. A time duration for which the RAM read instruction is prohibited to be issued, is much shorter than a time duration which expires when the RAM write instruction is completely finished. Thus, the RAM read instruction issue is not required to wait for the completion of execution of the RAM write instruction as in a known technique.

8 Claims, 7 Drawing Sheets

ARRANGEMENT OF CONTROLLING ISSUE TIMING OF A READ INSTRUCTION TO A COMMON BLOCK IN A VECTOR PROCESSOR

This application is a continuation of application Ser. No. 08/004,900, filed Jan. 21, 1993, now abandoned.

BACKGROUND OF THE INVENTION

1. Field of the Invention

The present invention relates generally to an arrangement of controlling issue timing of an instruction which includes a data retrieval from a RAM (Random Access Memory) provided in a vector processor, and more specifically to such an arrangement via which vector data can rapidly be read out from the RAM as compared with a known technique.

2. Description of Related Art

Vector processing has proven to be an effective approach to speeding up a large number of vectors using pipelined units which perform arithmetic operations on uniform, liner arrays of data values. A vector implies a linear collection of N variables (N is a positive integer) or a data structure that consists of an ordered set of elements. Throughout the instant disclosure, terms "vector" and "vector data" are interchangeably used for the same meaning.

It is a common practice to provide, within a vector processor, a vector memory for temporarily storing vector data to be referred to in subsequent vector processing. The vector memory takes the form of a RAM (Random Access Memory) which is physically, logically divided into a plurality of memory units as discussed later.

Before turning to the present invention it is deemed advantageous to describe a known arrangement with reference to FIGS. 1–4.

Referring to FIG. 1, there are schematically shown a RAM 10, a memory unit selector 12 and a time slot adjuster 14. The RAM 10 is physically divided into four (for example) memory unit MU0–MU3 each of which includes a plurality of vector element storage sections.

As shown, the memory unit MU0 includes vector element memory sections VD(0), VD0(4), VD1(0), ..., VDn(4), while the memory unit MU1 memory sections VD0(1), VD0(5), VD1(1), ..., VDn(5). Similarly, the memory unit MU2 includes memory sections VD0(2), VD0(6), VD1(2), ..., VDn(6) while the memory unit MU3 memory sections VD0(3), VD0(7), VD1(3), ..., VDn(7).

The vector element memory sections are logically divided into a plurality of memory blocks, viz., VD0(0)–VD0(7), VD1(0)–VD1(7), ..., VDn(0)–VDn(7) which are sometimes simply depicted by VD0, VD1, ..., VDn, respectively.

As shown in FIG. 1, each of memory blocks VD0–VDn is shared by the memory units MU0–MU3 and stores an incoming vector. In more specific terms, a vector which has undergone time slot adjustment (if necessary) at the adjuster 14 using a time slot adjust signal, is stored in one of the memory blocks VD0–VDn using write addresses under the control of write enable signals. The write addresses and write enable signals are applied to the memory units MU0–MU3 from a vector processor controller (not shown).

Elements of a vector, which are stored in one of the memory blocks VD0–VDn, are retrieved using read addresses applied to the memory units MU0–MU3. That is, the vector elements are successively derived from the RAM 10 in a predetermined order using the memory unit selector 12 which selects the memory units MU0–MU3 under the control of a memory unit select signal applied thereto.

The arrangement of FIG. 1 is operatively coupled to a crossbar (not shown) from which vectors are applied to the RAM 10. Vectors retrieved from the RAM 10 are also transferred to the crossbar. A crossbar is not directly concerned with the instant disclosure and also is well known in the art and, hence, further descriptions thereof will be omitted.

FIG. 2 shows timing charts which schematically illustrate the write/read operations in connection with the memory block VD0–VD1 (or memory units MU0–MU3).

A first row (A) of FIG. 2 depicts reference time slots "..., T1, T2, T3, T4, ..., T12, T13, ..." which are used to control overall operations of a vector processor. Time slots in a second row (B) of FIG. 2 are arranged in a manner identical with those in the first row (A) but are illustrated for the convenience of describing the read/write operations of the memory blocks VD0–VD1 (or memory units MU0–MU3) shown in FIG. 1. As shown, time slots in the row (B) are numbered 0, 1, 2 and 3. The reason why the time slots (B) are numbered 0, 1, 2 and 3, is that the RAM 10 is divided into four memory units MU0–MU3 in this particular case. Time slots in a row (C) of FIG. 2 are numbered in the same manner as the reference time slots (B) and are applied to the memory unit MU0. On the other hand, time slots in rows (E), (G) and (I), which are respectively applied to the memory units MU1, MU2 and MU3, are respectively numbered such that the preceding ones thereof (viz., time slots (C), (E) and (G)) are shifted to the right by one time slot.

FIG. 2 illustrates a manner which shows that eight elements of a vector are written into the memory block VD0(0)–VD0(7) using time slots 0. Each of the capital letters W in rows (D), (F), (H) and (J) indicates a write operation of a vector into the memory units MU0–MU3 (FIG. 1). On the other hand, a vector stored in the memory block VD1()–VD1(7) is read out of the memory units MU0–MU3 using time slots 2. Each of the capital letters R within rectangles indicates a read operation of the vector from the memory units MU0–MU3.

In FIG. 2, it is understood that the write and read instructions are implemented in parallel. These instruction can correctly be executed in that the memory blocks VD0 and VD1 respectively accessed by the write and read instructions are different with each other.

However, according to a known technique, if an instruction including a RAM read operation issues immediately after an instruction including a RAM write operation wherein both instructions are directed to the same memory block, the issuance of the instruction including a RAM read operation should be inhibited until the instruction including a RAM write operation is completely finished. The waiting time imposed on the RAM read operation undesirably lessens the overall operation efficiency of a vector processor.

An instruction which includes a RAM write or read operation, may be called as a RAM write or read instruction merely for the convenience of description.

The above mentioned problem inherent in the known technique will further be discussed with reference to FIGS. 3–5.

Reference is made to FIG. 3, wherein a known arrangement for controlling issue of RAM read/write instructions is illustrated in block diagram form.

The arrangement of FIG. 3, denoted by an instruction issue timing controller 29, is interconnected between an instruction controller and a vector processor controller both of which are not directly concerned with the present invention and hence are not shown in the instant disclosure for the sake of brevity.

Throughout the remainings of the instant disclosure, each of the memory blocks VD0–VDn which is designated by a RAM read or write instruction, is sometimes called "entry number".

The arrangement of FIG. 3 is generally provided with an instruction issue indicator 30, an entry number coincidence determiner 32 and a read-out time slot controller 34.

The instruction issue indicator 30 includes an instruction register 36 and an entry number register 38. An instruction, applied from the instruction controller (not shown), is stored in the instruction register 36. On the other hand, the register 38 is arranged to store an entry number which is accompanied by the instruction stored in the register 36.

It is assumed that: (a) two instructions including RAM write and read operations (depicted by first and second instructions) are successively applied to the arrangement of FIG. 3 and (b) the entry number of the first instruction is VD0 (viz., VD0(0)–VD0(7)).

The instruction issue indicator 30 further includes, an instruction decoder 40 which decodes the instruction stored in the register 36. If the decoder 40 ascertains that the instruction includes a RAM write operation, it supplies a write instruction controller 42 with a logic 1 (for example). The controller 42 further receives a flag bit from a flag register 44 of the entry number coincidence determiner 32 and also receives an available time slot indicating signal (2 bits) from a time slot flag register 46. Contrarily, if the decoder 40 determines that the instruction stored in the register 36 includes a RAM read operation, the decoder 40 applies a logic 1 to a read instruction controller 47.

In FIG. 3, only one entry number coincidence determiner (denoted by numeral 32) is provided merely for the convenience of simplifying the disclosure. However, in order to effectively achieve multiple accesses to the RAM 10 (FIG. 1), it is a common practice to provide two or more entry number coincidence determiners which are respectively assigned to multiple paths to the RAM 10 and each of which is configured in exactly the same manner as the determiner 32.

The flag register 44 holds a flag bit which changes a logic state from 0 to 1 in the event that the controller 29 generates information which indicates issue timing of a RAM write instruction, as will be referred to later. The flag register 44 retains a logic 1 until the RAM write operation is completed. The flag register 44 initially stores a flag bit assuming a logic 0 and accordingly, the write instruction controller 42 is advised that any other RAM write operation is not presently implemented using the determiner 32.

The time slot flag register 46 includes, in this particular case, four one-bit registers 46a–46d which are respectively assigned to the time slots 0, 1, 2 and 3 and each of which stores a logic 0 if the corresponding time slot is available. In the event that a plurality of time slots are simultaneously available, the time slot with the smallest number is first selected and used. It is assumed that the flag register 46 indicates that all the time slots (viz., 0–3) are free at this time. Thus, the write instruction controller 42 is informed that the time slot 0 should be used.

Subsequently, the write instruction controller 42 issues a control signal A (assuming logic 1) over a line 48. The control signal A is applied to the flag register 44 which, in response to the control signal A, changes the logic state thereof from 0 to 1. Further, the control signal A is applied to an entry number retainer (viz., register) 50 which, in response to the control signal A, stores the entry number held in the register 38.

Still further, the control signal A is applied, via an CR gate 49, to an instruction issue indicator 54, a time slot indicator 56 and an entry number indicator 58 each of which takes the form of a register.

In response to the generation of the control signal A, the three indicators 54, 56 and 58 store the following information. That is, the indicator 54 stores a logic 1 which is applied from the instruction decoder 40 and which indicates the RAM write instruction in this instance. The time slot indicator 56 receives the time slot 0 (viz., the time slot with the smallest number among the available time slots) from the write instruction controller 42 and stores same therein. Further, the entry number indicator 58 stores the entry number VD0 applied from the entry number register 38. When the entry number stored in the register 38 is transferred to the blocks 50 and 58, the entry number register 38 no longer stores the entry number VD0 applied thereto.

Subsequently, the pieces of the information stored in the indicators 54, 56 and 58 are applied to the vector processor controller (not shown). In other words, the vector processor controller coupled to the instruction issue timing controller 29, is informed of issue timing of the above mentioned RAM write instruction. The output of the blocks 54 and 56, depicted by "B" and "C", are applied to a decoder 57 which changes the content of the time slot flag register 46a from "0" to "1".

The above mentioned operations, that the controller 29 (viz., the FIG. 3 arrangement) receives the RAM write instruction and then generates the information from the indicators 54, 56 and 58, are implemented within one time slot.

It is assumed that: (a) a RAM read instruction is applied to the instruction issue timing controller 29 at time slot which follows immediately the time slot wherein the above mentioned RAM write instruction is applied and (b) the entry number is VD1 (viz., VD1(0)–VD(7)).

The RAM read instruction is stored in the instruction register 36, while the entry number VD1 in the entry number register 38. The instruction decoder 40 specifies the RAM read instruction and applies a logic 1 to the read instruction controller 47. A comparator 60 compares the entry number VD1 stored in the register 38 and the entry number VD0 retained in the entry number retainer 50. (The entry number VD0 has been stored during the preceding RAM write instruction and preserved in the register 50.) In this instance, the comparator 60 issues a logic 0 in that the two entry numbers are not identical. Accordingly, an AND gate 62 issues a coincidence signal D which assumes a logic 0 indicative of incoincidence or mismatch and which is applied to the read instruction controller 47.

It is further assumed that, when the RAM read instruction controller 47 receives a logic 1 from the instruction decoder 40, the flag section 46a holds a logic 1 in that the preceding RAM write operation has not yet been completed. Thus, the flag register 46 applies time slot 1 to the read instruction controller 47 and also to a read-out time slot determiner 64. At the present time, time slot 1 is the time slot having the smallest number among the three available slots 1–3. A time slot counter 66 cyclically generates slot numbers 0, 1, 2, and 3 in combination with an adder 68. The output of the counter 66 is applied to the determiner 64 and the read instruction controller 47. If the time slot timing determiner 64 detects coincidence between available time slots applied from the flag 46 and the counter 66, the determiner 64 applies a logic 1 to the read instruction controller 47.

Since the data read entry number VD1 differs from the entry number VD0 which is used by the RAM write instruction, the read operation can correctly be implemented independently of the above mentioned RAM write operation. Accordingly, the read instruction controller 47 issues a logic 1, over a line 51, which is applied to the indicators 54, 56 and 58 via the OR gate 49.

Similar to the aforesaid RAM write instruction, in response to the issuance of a logic 1 from the controller 47, the three indicators 54, 56 and 58 store the following information. That is, the indicator 54 stores a logic 1 which is applied from the instruction decoder 40 and which indicates the RAM read instruction in this instance. It should be noted that the indicator 54 stores a logic 1 which is the same logic state as in the RAM write instruction. However, the vector processor controller (not shown) coupled to the FIG. 3 arrangement is able to determine that the logic 1 stored in the indicator 54 indicates the issue timing of the RAM read instruction. On the other hand, the time slot indicator 56 receives the time slot 1 from the read instruction controller 47 and stores same therein. This means that the time slot 1 will be used for reading a vector out of the entry number VD1 of the RAM memory 10. Further, the entry number indicator 58 stores the entry number VD1 applied from the entry number register 38.

Subsequently, the pieces of the information stored in the indicators 54, 56 and 58 are applied to the vector processor controller (not shown). Thus, the vector stored in the entry number VD1 is retrieved therefrom.

Contrarily, if the above mentioned RAM read instruction is to retrieve the vector which is stored in the same entry number VD0 as utilized by the RAM write instruction, the comparator 60 detects the coincidence between the entry numbers (viz., VD0s) applied from the register 38 and the entry number retainer 50. Accordingly, the comparator 60 generates a logic 1. Further, if the preceding RAM write instruction has not yet been completed, the flag register 44 still assumes a logic 1. Thus, the AND gate 62 supplies the read instruction controller 47 with the coincidence signal D assuming a logic 1. In such a case, the read instruction controller 47 does not generate a logic 1 over the line 51 until receiving a logic 0 from the AND gate 62. In other words, neither of the three indicators 54, 56 nor 58 generate a control signal indicative of issuance of the RAM read instruction until the preceding RAM write instruction is completely executed.

The operations of the instruction issue timing controller 29 are further discussed with reference to FIGS. 4 and 5.

FIG. 4 is timing charts which schematically illustrates successive execution of the following instructions:

VADD VD0←VR0+VR1

VMDA VR2←VD1

The instruction VADD implies operations that two vectors stored in registers VR0 and VR1 (not shown) are added and then the sum obtained is written into the memory block VD0 (viz., VR0(0)–VR0(7)). On the other hand, the instruction VMDA indicates operations that a vector memorized in the memory block VD1 is read therefrom and then applied to a register VR2 (not shown). The registers VR0, VR1 and VR2 are provided in an external arrangement (not shown).

In FIG. 4, "PPT" is an abbreviation for "Pre-Process Time" which is a time duration from issuance of a RAM read instruction to an actual data read operation from one of the memory blocks VD0–VDn or from the registers such as VR0–VR2. The "PPT" is a constant value determined when designing a vector processor. On the other hand, "FUT" is an abbreviation for "Function Unit Time" which means an execution time period and may assume different values depending on instructions to be executed. It is assumed that the "PPT" and "FUT" respectively correspond to the time periods of 3 and 7 time slots in the instant disclosure.

The information which controls issue of the instruction VADD, is generated from the indicators 54, 56 and 58 (FIG. 3) at reference time slot T2. After three time slots of "PPT", the contents of the registers VR0 and VR1 are read out and then added. Subsequently, after seven time slots of "FUT", the computing result (viz., sum obtained) is written into an appropriate register (not shown in FIG. 3). Timing of generating vector elements of the sum obtained is illustrated in FIG. 4. Thereafter, the sum is written into the memory block VD0 using time slots 0.

In FIG. 4, the instruction VMDA is applied to the controller 29 at reference time slot T4. The memory block VD1 from which vector data is to be retrieved, differs from the memory block VD0 into which the preceding instruction VADD stores the vector data. Therefore, the controller 29 issues the information which controls issue of the instruction VMDA at the same time slot T4 at which the controller 29 receives the instruction VMDA. After three time slots of PPT, a vector stored in the memory block VD1 is read out using time slot 1 (viz., time slot with the smallest number among available slots 1–3). Following this, the elements of the vectors retrieved from VD1 are successively stored into the register VR2 (not shown).

FIG. 5 is timing charts for discussing successive execution of the following instructions:

VADD VD0←VR0+VR1

VMDA VR2←VD0

The instruction VADD is executed in exactly the same manner as in FIG. 4 and hence this instruction VADD will not be further discussed for the sake of brevity. The other instruction VMDA reads the vector out of the memory block VD0 and then writes same into the register VR2. It should be noted that the two instructions VADD and VMDA utilize the same memory block VD0.

As discussed in connection with FIG. 3, if a RAM read instruction is to b executed on the same memory block as the preceding RAM write instruction, the former instruction is executed after the latter instruction is completely finished. As illustrated in FIG. 5, even if the RAM read instruction is applied to the controller 29 (FIG. 3) at reference time slot T3, the controller 29 is unable to generate the information, which indicates issue timing of the RAM read instruction, until reference time slot T23. The RAM read operation is carried out, from reference time slot T27, using time slots 0 in that time slot 0 is the smallest numbered one among the slots 0–3 which are rendered available when the execution of the instruction VADD is finished.

As discussed above in detail, the known arrangement has encountered the problem in that, if a RAM read instruction is to be executed on the same memory block as the preceding RAM write instruction, the issuance of the RAM read instruction is undesirably delayed until the RAM write instruction is completely executed. Accordingly, it is highly desirable if the RAM read instruction can be issued as soon as possible without waiting for the completion of the RAM write instruction.

SUMMARY OF THE INVENTION

It is an object of the present invention to provide an arrangement via which a RAM read instruction can be executed without waiting for completion of a RAM write instruction which is followed by the RAM write instruction even if the same memory block is to be used by the two instructions.

In brief, the above object is achieved by an arrangement wherein, in order to effectively accelerate issue of a RAM read instruction which is to access the same memory block as a preceding RAM write instruction, when the RAM write instruction is issued, a counter initiates counting-up of a value indicative a predetermined time duration. When the counter counts up the value, the RAM read instruction is allowed to be issued at appropriate timing. A time duration for which the RAM read instruction is prohibited to be issued, is much shorter than a time duration which expires when the RAM write instruction is completely finished. Thus, the RAM read instruction issue is not required to wait for the completion of execution of the RAM write instruction as in a known technique.

An aspect of the present invention comes in an arrangement of setting an instruction issue prohibiting time in a vector processor which includes memory means which is physically divided into N memory units (N is a positive integer) and logically divided into a plurality of memory blocks which are shared by the N memory units. A vector is written into or read out of one of the plurality of memory blocks using one of consecutive N time slots which are cyclically generated. The arrangement comprises, first means for decoding an instruction applied thereto and determining whether the instruction is a first instruction including a memory write operation or a second instruction including a memory read operation, the first means further receiving one of the plurality of memory blocks which is designated by the instruction; second means coupled to the first means and informed therefrom that the instruction has been determined to be the first instruction, the second means generating a first control signal which indicates that the first instruction is allowed to be applied to the memory means, the first control signal further indicating one of the plurality of memory blocks which is designated by the first instruction and indicating a time slot to be used by the first instruction; third means coupled to the first means and informed therefrom that the instruction has been determined to be the second instruction; fourth means generating sequentially the N time slots and selecting an available time slot among the N time slots and applying the selected time slot to one of the second and third means, the selected time slot corresponding to the time slot to be used by the first instruction if being applied to the second means; fifth means coupled to the second and third means and receiving the time slot, which has been selected by the fourth means and applied to the second means, from the second means and storing same; sixth means coupled to the third, fourth and fifth means, the sixth means being responsive to the first control signal and applying a second control signal to the third means after a predetermined time duration and when the time slot stored in the fifth means becomes a predetermined relation with one of the N time slots generated from the fourth means. The third means is responsive to the second control signal applied thereto and generating a third control signal which indicates that the second instruction is allowed to be applied to the memory means, the third control signal further indicating one of the plurality of memory blocks which is designated by the second signal and indicating the selected time slot applied from the fourth means.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 6:
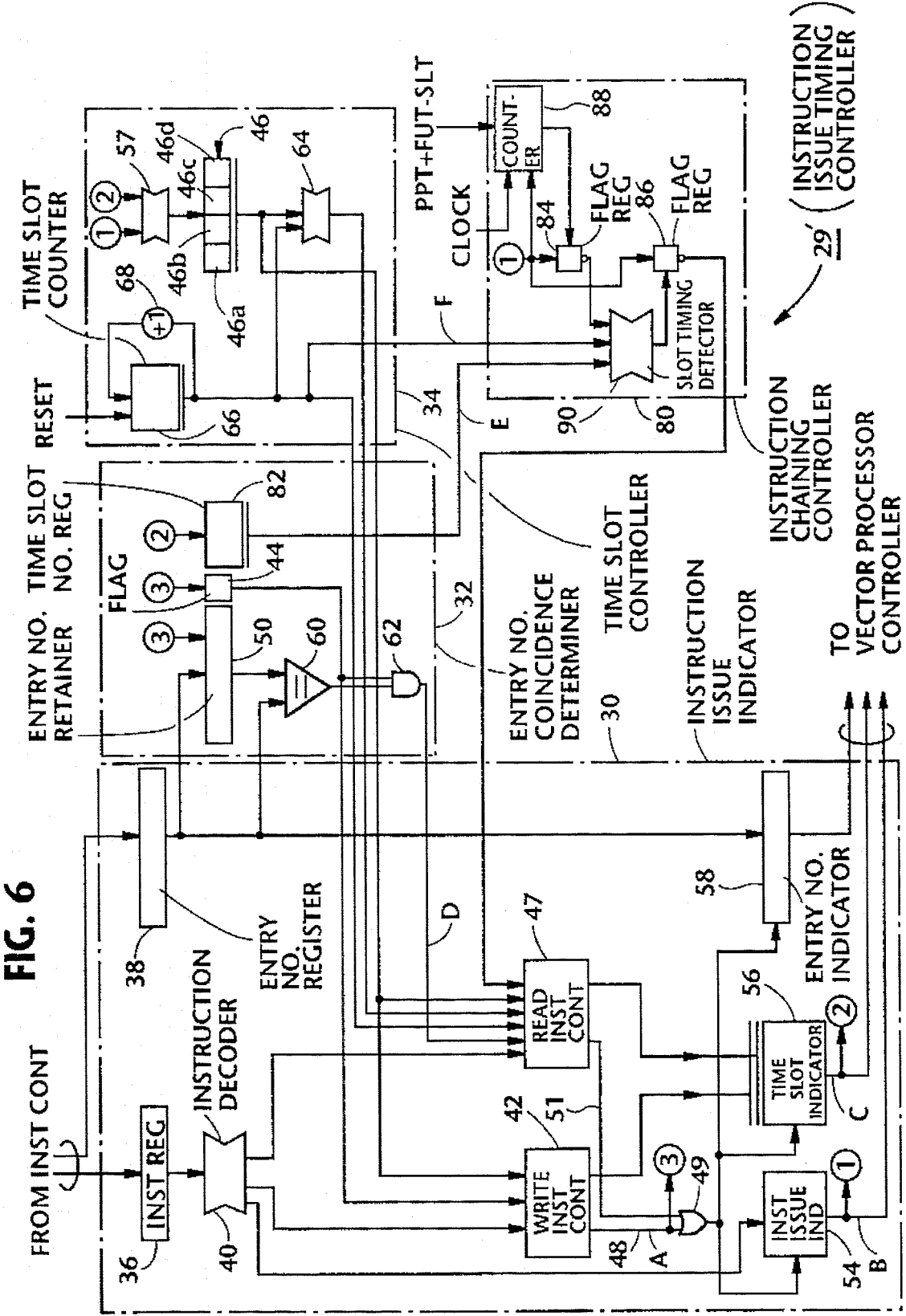
FIG. 6 is a block diagram showing an embodiment of the present invention.

One embodiment of the present invention will be discussed with reference to FIGS. 6 and 7.

Figure 3:
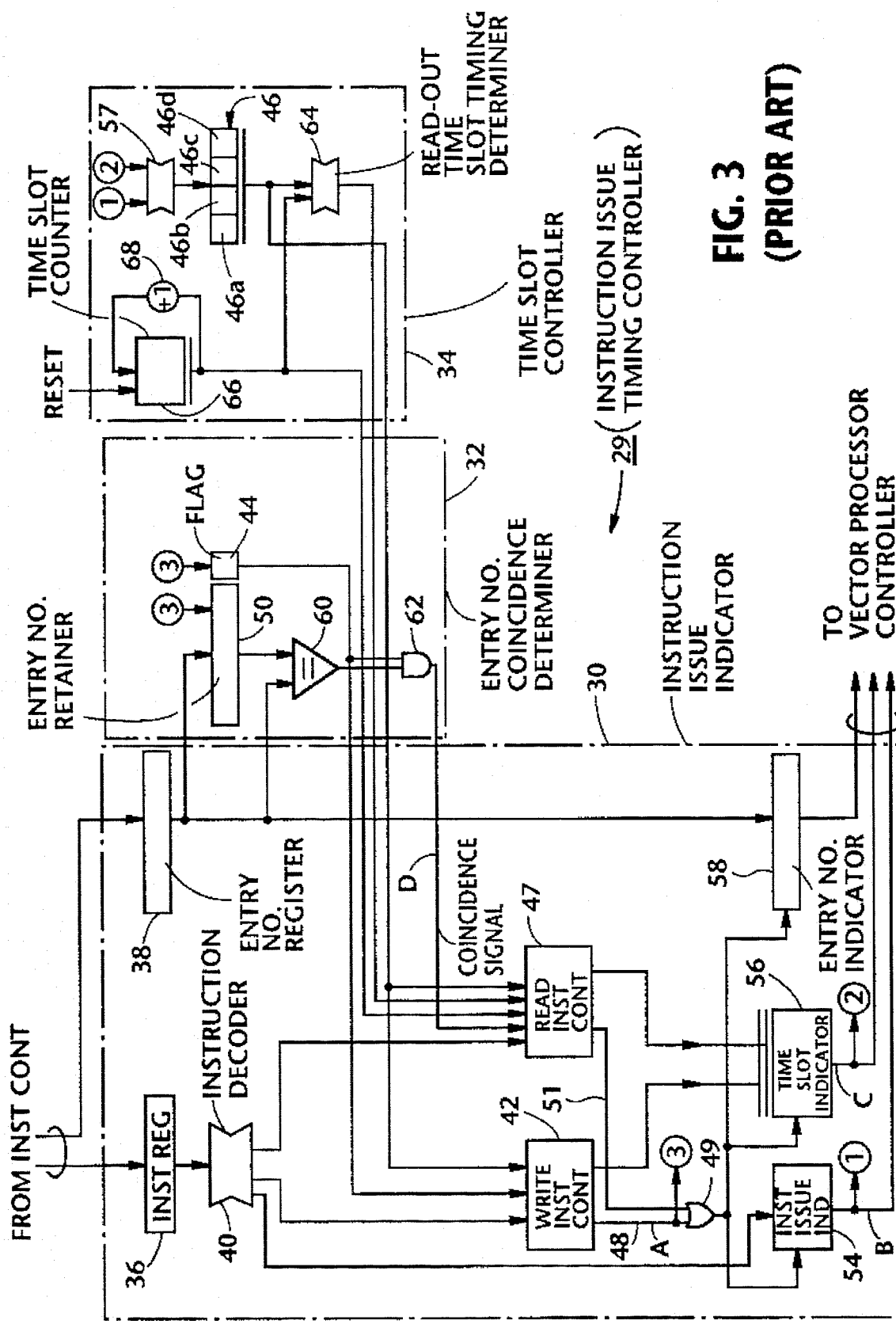
FIG. 3 is a block diagram for discussing the known arrangement, having been referred to in the opening paragraphs of the instant disclosure.

An instruction issue timing controller 29' (viz., the arrangement of FIG. 6), differs from the counterpart 29 (FIG. 3) in that the controller 29' further includes an instruction chaining controller 80 and a time slot number register 82 which is provided in the entry number coincidence determiner 32. The remaining portions of FIG. 6 will not be referred to for the sake of brevity since already referred to, except for the cases necessary for the discussion of the instant invention. The instruction chaining controller 80 includes two flag registers 84, 86, a counter 88, and a slot timing detector 90.

According to the present invention, even if a RAM read instruction is to access the memory block which is also designated by a preceding RAM write instruction, the issue timing of the RAM read instruction can be generated without waiting for completion of the preceding RAM write instruction.

In other words, when the controller 29' receives a RAM write instruction, the controller 29' sets a predetermined time period for which a RAM read instruction applied to the controller 29' at a later time is prohibited to be issued if the two instructions use same memory block. The predetermined time duration is much shorter than the time period which is terminated upon completing the RAM write instruction.

The present invention is not concerned with the case where a RAM read operation is carried out on a memory block which is different from that utilized in the preceding RAM write instruction. In this instance, the arrangement of FIG. 6 works in exactly the same manner as described in connection with FIG. 4.

Figure 5:
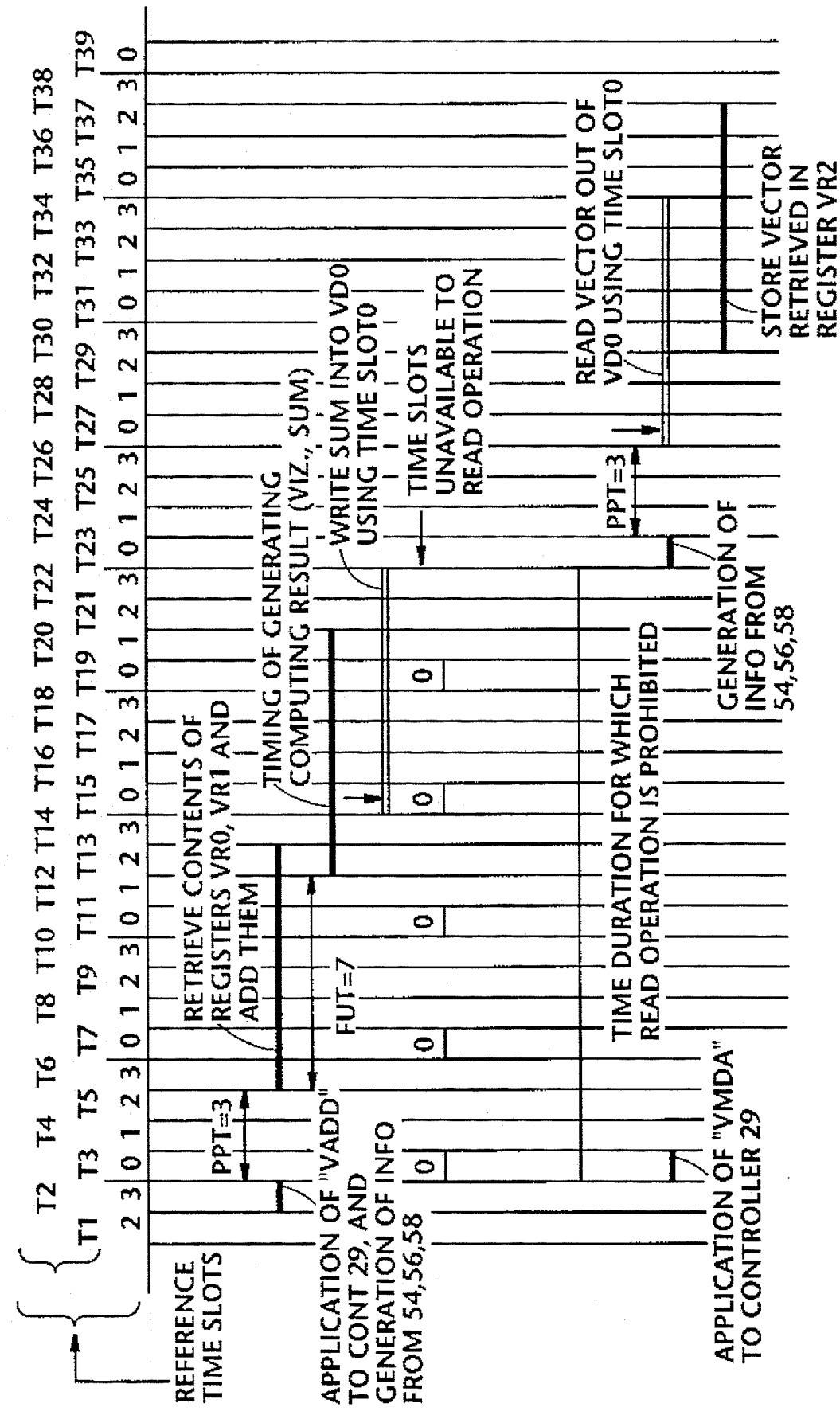

The operations of the FIG. 6 arrangement will be discussed with reference to FIG. 7. For the purpose of a better understanding, the same instructions as already described in connection with FIG. 5 are again presented. That is:

VADD VD0←VR0+VR1

VMDA VR2←VD0

Figure 4:
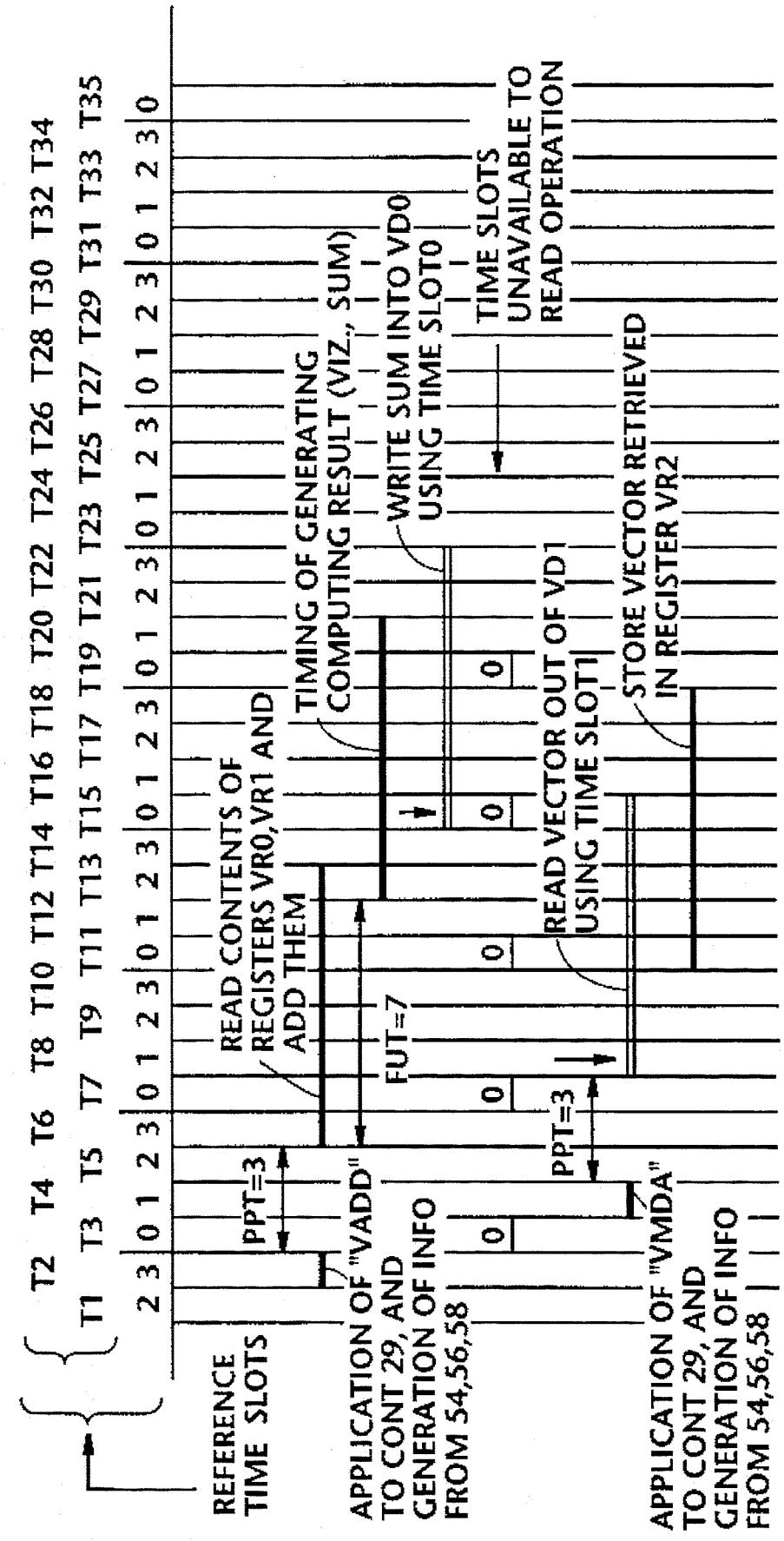
FIGS. 4 and 5 are timing charts depicting the operations of the arrangement shown in FIG. 3.

The instruction VADD is executed in exactly the same manner as described in connection with FIG. 4 and accordingly, the instruction VADD will not be referred to in detail. The following instruction VMDA includes a RAM read operation on the same memory block VD0 as used by the instruction VADD. The data retrieved from VD0 are moved to the register VR2 (not shown).

Figure 7:
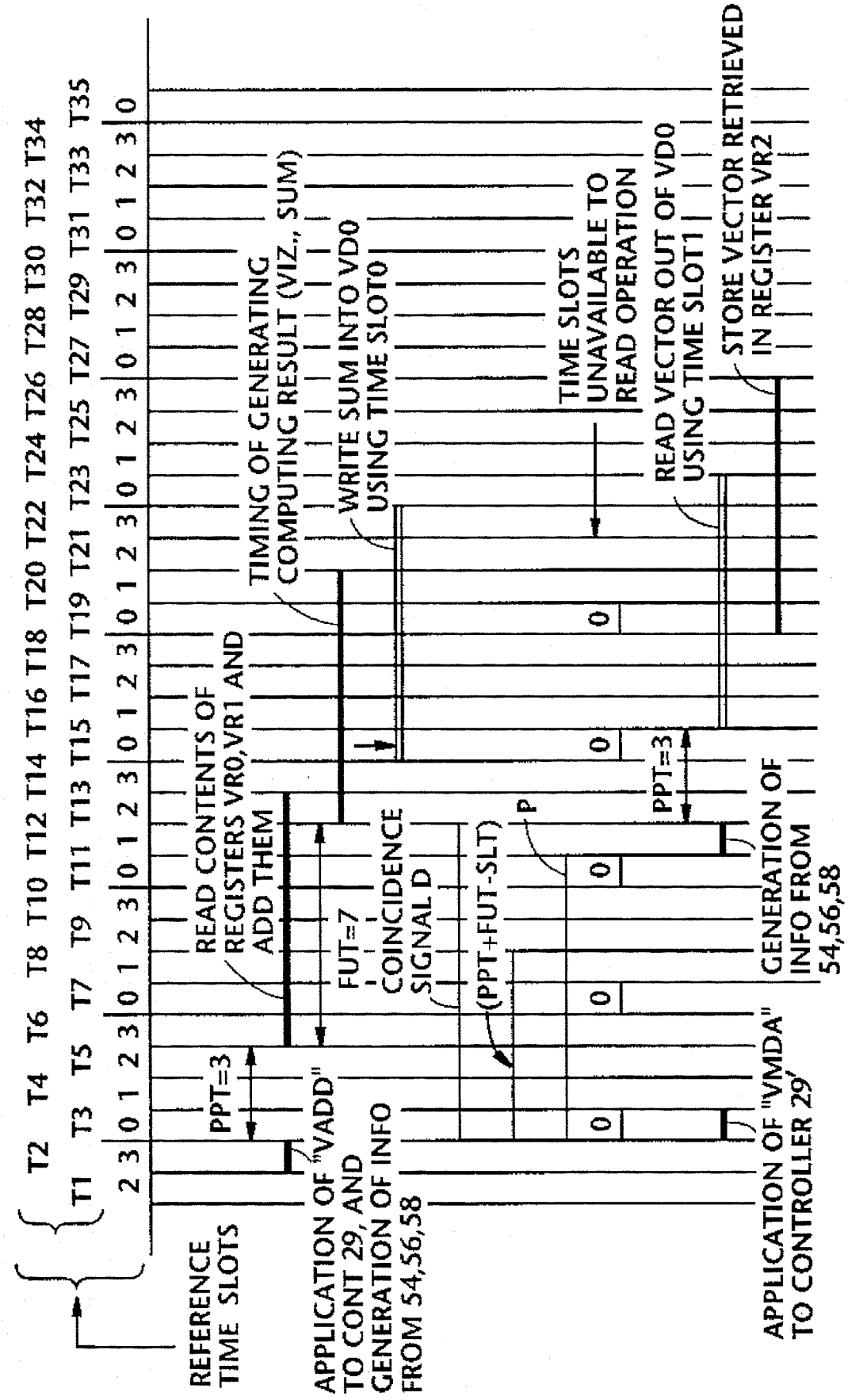
FIG. 7 is timing charts depicting the operations of the arrangement of FIG. 6.

The instructions VADD and VMDA are respectively applied to the controller 29' at reference time slots T2 and T3, as illustrated in FIG. 7.

Thus, at reference time T3, the entry number retainer 50 stores the entry number VD0 which is accompanied by the instruction VADD. The flag register 44 still holds a flag bit assuming a logic 1 in that the instruction VADD has not been completed. Therefore, the output of the AND gate 62 (viz., coincidence signal D) assumes a logic 1 at reference time T3.

Before the instruction VADD is applied to the controller 29', the counter 88 receives a value indicative of time duration defined by

Figure 1:
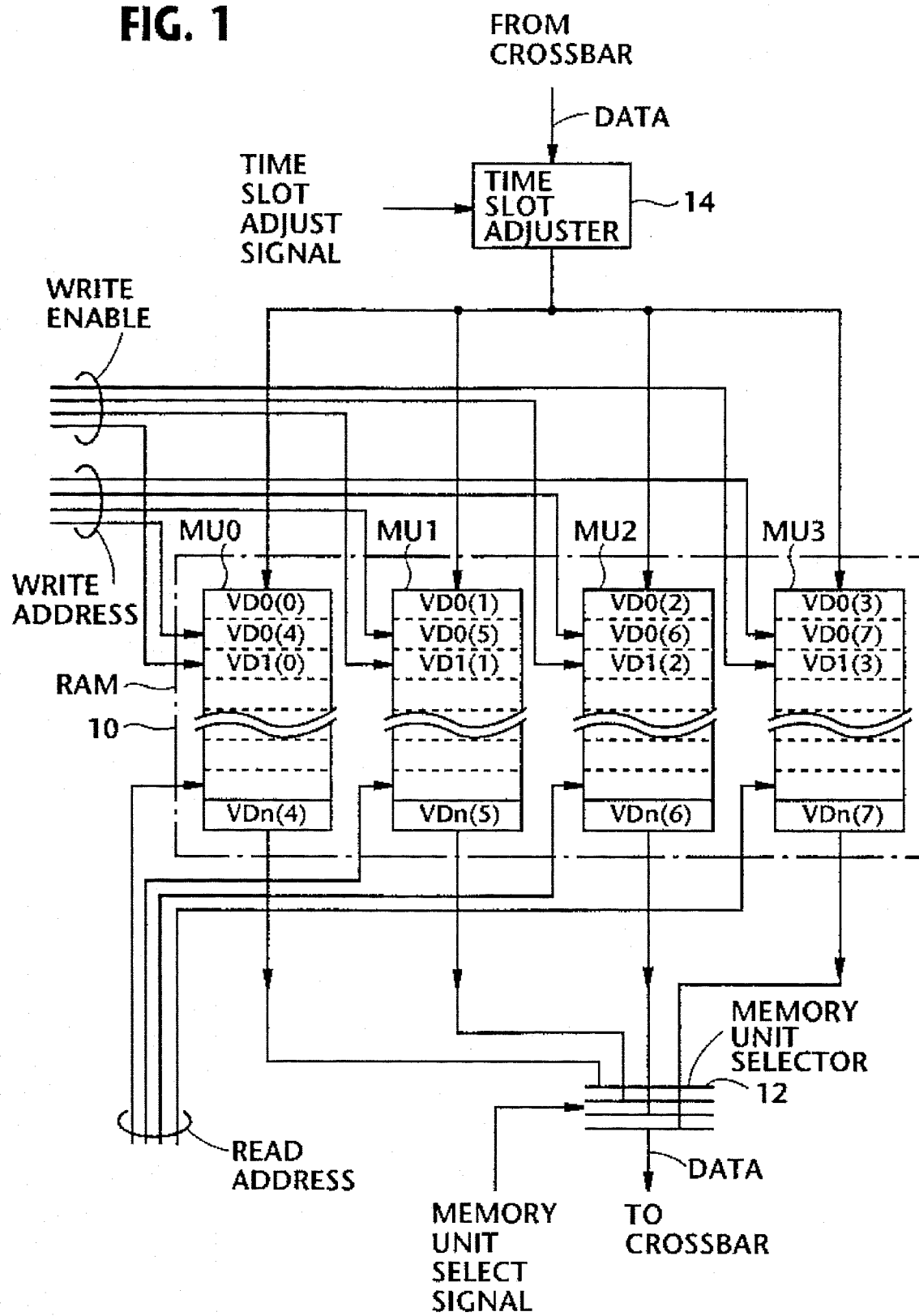
FIG. 1 is a block diagram schematically showing a RAM which is divided into a plurality of memory modules and which is applicable to either the known arrangement or the present invention, this figure having been referred to in the opening paragraphs of the instant disclosure.
Figure 2:
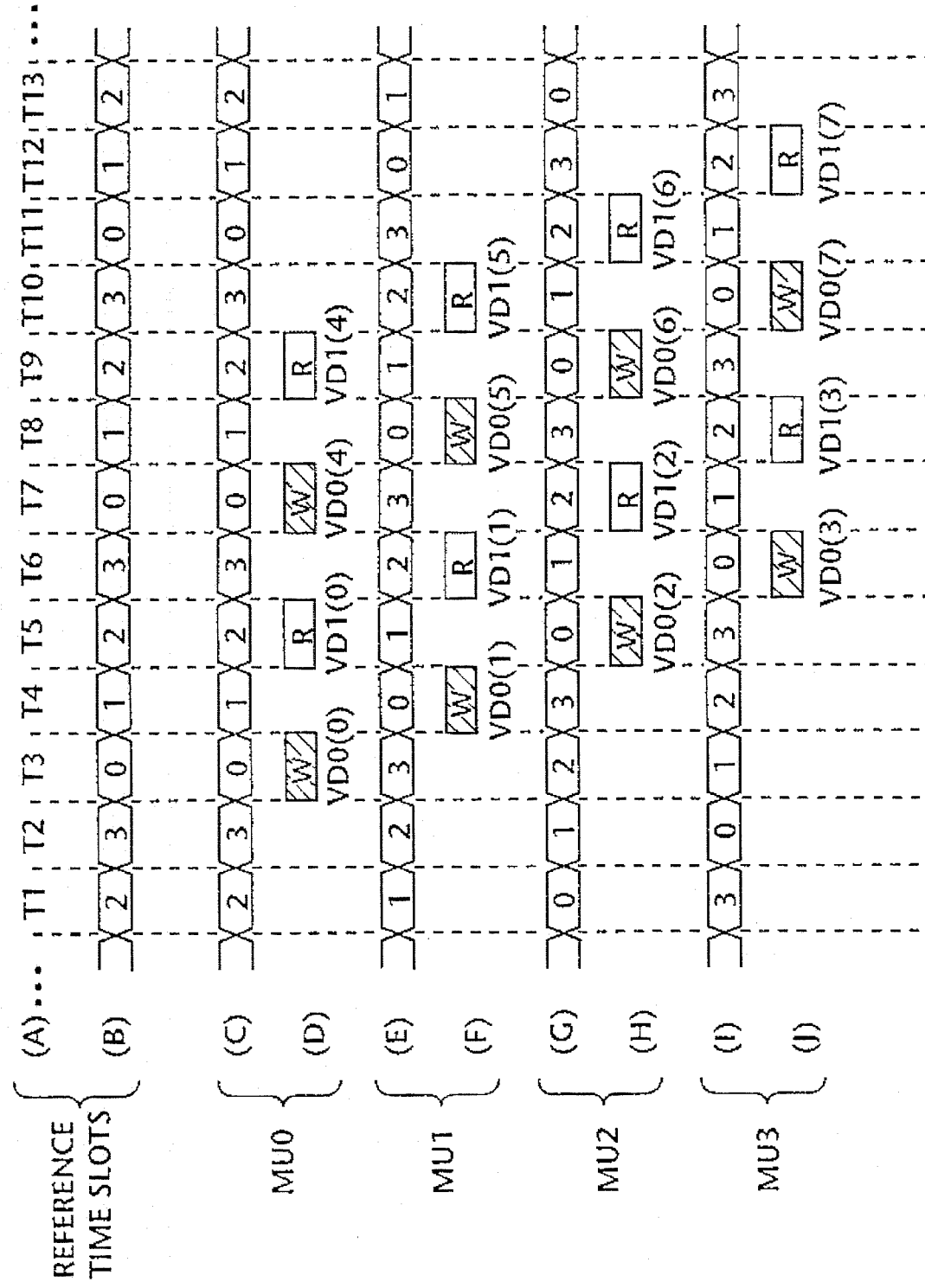
FIG. 2 is timing charts depicting the operations of the arrangement shown in FIG. 1.

PPT+FUT−SLT where SLT denotes the number of time slots 0–3 (viz., 4 in this particular case) which equals the number of the memory units MU0–MU3 (FIG. 1). Since PPT=3 and FUT=7, PPT+FUT−SLT=6. It is necessary to renew the content of the reset circuit 88 if FUT is different from the previous value.

When a control signal which indicates the issue timing of the instruction VADD is generated at reference time slot T2, the signal B is applied to the counter 88 and the flag registers 84, 86 at reference time slot T3. The counter 88 is responsive to the signal B and starts counting-up of the above mentioned time slots using clocks applied thereto. On the other hand, each of the flag registers 84, 86 changes the flag bit from "0" to "1" in response to the signal B (viz., the registers 84, 86 are set). When the counter 88 has counted up six time slots, it changes the content of the flag register 84 from "1" to "0" at reference time slot T9 (viz., the register 84 is reset). Since the output of the flag register 84 is inverted, the slot timing detector 90 is supplied with a logic 1 from the flag register 84.

In response to the resetting of the flag register 84, the detector 90 initiates the operations thereof. That is, the detector 90 receives a signal E from the time slot number register 82. The signal E indicates time slot 0 which is to be used by the instruction VADD. Further, the slot timing detector 90 receives a signal F which indicates the output of the time slot counter 66 (viz., time slots 0–3). When the time slot applied from the register 82 (viz., "0") coincides with that applied from the tie slot counter 66, the detector 90 resets the flag register 86 (viz., the content of the register 86 changes from "1" to "0"). The flag bit of the flag register 86 is inverted and then applied to the read instruction controller 47.

The read instruction controller 47 is already informed of time slot 1 (viz., the time slot having the smallest number among the available slots) which is to be used with the instruction VMDA. The controller 47, in response to the resetting of the register 86, detects the timing of time slot 1 using the output of the read-out time slot timing determiner 64 at reference time slot T12. In FIG. 7, a line P indicates a time period for which the issue of the RAM read instruction is prohibited in the above mentioned embodiment.

Following this, the read instruction controller 47 generates a logic 1 which is applied to the indicators 54, 56 and 58. In this instance, the time slot indicator 56 stores time slot 1 which is used in the following RAM read operation.

After three time slots of PPT (T13–T15), vector elements stored in the memory block VD0 at reference time slots T15–T22 are successively read out using time slot 1 at the following reference time slots T16–T23, respectively. The vector elements thus retrieved are succeedingly stored in the register VR2 at reference time slots T19–T26 in this embodiment.

In the above discussion, the slot timing detector 90 detects the coincidence of the time slots applied from the time slot number register 82 and the time slot counter 66. However, the present invention is not limited to such a case. As an alternative, the detector 90 may be arranged to reset the flag register 86 when detecting the time slot number difference of the two slots applied thereto which indicates one or two (for example).

As mentioned in the opening paragraphs, two or more entry number coincidence determiners may be provided which are respectively assigned to the multiple paths to the RAM 10 (FIG. 1). In such a case, it is necessary to provide the same number of instruction chaining controllers which are respectively assigned to the multiple paths.

It will be understood that the above disclosure is representative of two possible embodiments of the present invention and that the concept on which the present invention is based is not specifically limited thereto.

What is claimed is:

1. An arrangement of controlling instruction issue timing in a vector processor which includes a memory means which is physically divided into N memory units (N is a positive integer) and logically divided into a plurality of memory blocks which are shared by said N memory units, a vector being written into or read out of one of said plurality of memory blocks using one of consecutive N time slots which are cyclically generated, said arrangement comprising:

first means for decoding an instruction applied thereto and determining whether said instruction is a memory write instruction or a memory read instruction, said first means further receiving one of said plurality of memory blocks which is designated by said instruction;

second means coupled to said first means and informed therefrom that said instruction has been determined to be said memory write instruction, said second means generating a first control signal which enables said memory write instruction to be applied to said memory means, said first control signal further indicating one of said plurality of memory blocks which is designated by said memory write instruction;

third means coupled to said first means and informed therefrom that said instruction has been determined to be said memory read instruction for controlling memory read operations;

fourth means for generating sequentially said N time slots and selecting available time slots among said N time slots and applying respectively one of the selected available time slots to said second and third means;

fifth means coupled to said second means for receiving and storing a selected time slot applied to said second means; and sixth means coupled to said third, fourth and fifth means and being responsive to said first control signal for counting a predetermined time duration when said memory read instruction indicates a read operation from one of said memory blocks which is also indicated as a memory block of a write operation of a preceding memory write instruction, said sixth means being responsive to count-up said predetermined time duration for applying a second control signal to said third means when said selected time slot matches one of said N time slots generated by said fourth means, wherein said third means, responsive to said second control signal, generates a third control signal enabling execution of said memory read instruction using one of said N time slots other than said selected time slot.

2. An arrangement as claimed in claim 1, wherein said sixth means generates said second control signal when the selected time slot stored in said fifth means coincides with one of said N time slots generated from said fourth means.

3. An arrangement as claimed in claim 1, wherein said sixth means includes:

a counter which stores a value indicative of said predetermined time duration, said counter initiating an operation thereof in response to said first control signal applied thereto and generating a fourth control signal when counting up said value;

a first flag register which is set in response to said first control signal applied thereto and being reset in response to said fourth control signal;

a slot comparator which is responsive to the resetting of said first flag register and detecting that the time slot stored in said fifth means becomes a predetermined relation with one of said N time slots generated from said fourth means and generating a fifth control signal; and a second flag register which is set in response to said first control signal applied thereto and being reset in response to said fifth control signal and generating said second control signal.

4. An arrangement as claimed in claim 3, wherein said sixth means generates said second control signal when the selected time slot stored in said fifth means coincides with one of said N time slots generated from said fourth means.

5. A method of controlling instruction issue timing of a subsequent memory read instruction, in a vector processor which includes a vector memory physically divided into N memory units (N being an integer) and logically divided into a plurality of memory blocks, vectors being written to or read from said memory blocks using one of N consecutive cyclically generated time slots, said subsequent memory read instruction indicating a read operation from one of said memory blocks, said one of said memory blocks also being indicated as a write destination by a preceding memory write instruction, said method comprising the steps of:

decoding a first instruction including a memory write instruction and determining which of said memory blocks is designated as a write destination of said memory write instruction;

selecting a first time slot to be used for carrying out a write operation of said memory write instruction;

generating a first control signal controlling said write operation of said memory write instruction to said vector memory, said first control signal indicating a particular memory block as said write destination;

decoding a second instruciton including a memory read instruction;

determining whether said memory read instruction is for reading from said particular memory block;

producing a second control signal to issue said memory read instruction after a predetermined time duration and when said first time slot matches one of said N consecutive cyclically generated time slots; and determining a second time slot, which is different from said first time slot, to be used for carrying out a read operation of said memory read instruction in response to the second control signal.

6. A method as recited in claim 5, wherein said predetermined time duration is determined on the basis of a time duration, for said vector processor, from issuance of a memory read instruction to an actual data read operation from said memory block, an execution time period for an instruction to be executed by said vector processor and the number of time slots N.

7. An arrangement as claimed in claim 1, wherein said sixth means comprises:

a counter configured to receive an indication of when said memory read instruction indicates a read operation from one of said memory blocks which is also indicated as a memory block of a write operation of a preceding memory write instruction, said counter configured to count up from zero to said predetermined time duration upon receiving said indication and to output a count indication indicative thereof;

a first flag register being in one of a first state and a second state and being initially set to said second state, said first flag register configured to receive said indication of when said memory read instruction indicates a read operation from one of said memory blocks which is also indicated as a memory block of a write operation of a preceding memory write instruction, said first flag register being set to said second state upon receiving said indication, said first flag register also configured to receive said count indication from said counter and being set to said first state upon receiving said count indication;

a slot timing detector coupled to said first flag register and configured to receive said selected available time slots sent from said fourth means, said slot timing detector configured to output a slot available indication of time slots other than said selected available time slots when said first flag register is in said second state; and a second flag register being in one of a first state and a second state and being initially set to said second state, said second flag register configured to receive said slot available indication and configured to receive said indication of when said memory read instruction indicates a read operation from one of said memory blocks which is also indicated as a memory block of a write operation of a preceding memory write instruction, said second flag register being set to said first state upon receiving said slot available indication, wherein third control signal corresponds to said second flag register being in said first state.

8. An arrangement of controlling instruction issue timing in a vector processor which includes a memory means which is physically divided into N memory units (N is a positive integer) and logically divided into a plurality of memory blocks which are shared by said N memory units, a vector being written into or read out of one of said plurality of memory blocks using one of consecutive N time slots which are cyclically generated, said arrangement comprising:

first means for decoding an instruction applied thereto and determining whether said instruction is a memory write instruction or a memory read instruction, said first means further receiving one of said plurality of memory blocks which is designated by said instruction;

second means coupled to said first means and informed therefrom that said instruction has been determined to be said memory write instruction, said second means generating a first control signal which enables said memory write instruction to be applied to said memory means, said first control signal further indicating one of said plurality of memory blocks which is designated by said memory write instruction;

third means coupled to said first means and informed therefrom that said instruction has been determined to be said memory read instruction for controlling memory read operations;

fourth means for generating sequentially said N time slots and selecting available time slots among said N time slots and applying respectively one of the selected available time slots to said second and third means;

fifth means coupled to said second means for receiving and storing a selected time slot applied to said second means; and sixth means coupled to said third, fourth and fifth means and being responsive to said first control signal for counting a predetermined time duration when said memory read instruction indicates a read operation from one of said memory blocks which is also indicated as a memory block of a write operation of a preceding memory write instruction, said sixth means being responsive to count-up said predetermined time duration for applying a second control signal to said third means when said selected time slot matches one of said N time slots generated by said fourth means, wherein said third means, responsive to said second control signal, generates a third control signal enabling execution of said memory read instruction using one of said N time slots other than said selected time slot, and wherein said predetermined time duration is a function of said N time slots, a preprocessing time of said vector processor, and an execution time of said vector processor.

* * * * *